T. C. RICHARDS.
NAIL FOR PICTURES, &c.
No. 110,500. Patented Dec. 27, 1870.
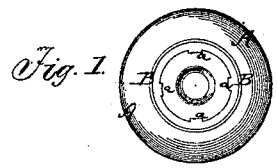
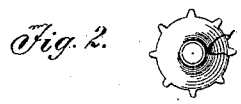
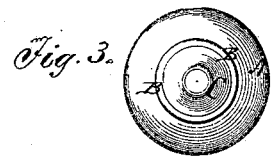
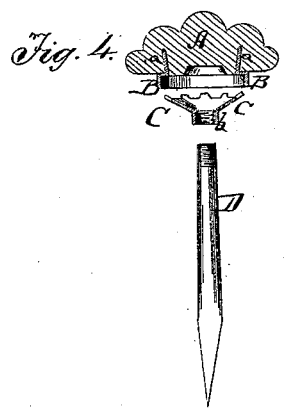
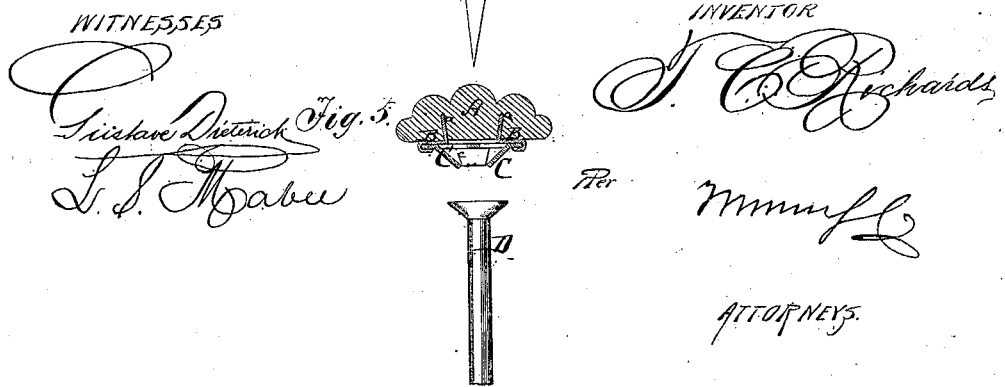

United States Patent Office.

THOMAS C. RICHARDS, OF NEW YORK, N. Y.

Letters Patent No. 110,500, dated December 27, 1870.

IMPROVEMENT IN NAILS FOR PICTURES, &c.

The Schedule referred to in these Letters Patent and making part of the same.

*To all whom it may concern:*

Be it known that I, THOMAS C. RICHARDS, of the city, county, and State of New York, have invented a new and useful Improvement in Knobs, Nail-heads, Buttons, &c., Made of Glass; and I do hereby declare that the following is a full, clear, and exact description thereof, which will enable others skilled in the art to make and use the same, reference being had to the accompanying drawing forming part of this specification, in which—

Figure 1 represents a face view of a nail-head and metal fastening-ring applied thereto.

Figure 2 is a face view of the plate held by said ring.

Figure 3 is a face view of head, ring, and plate united.

Figure 4 is a central section of the nail and plate separated.

Figure 5 is a central section of the same, showing them united.

Similar letters of reference indicate corresponding parts.

This invention has for its object to provide a convenient fastening on glass buttons, knobs, nail-heads, &c., of the plates to which the eyes, shanks, nails, or other holders are secured.

The invention consists in the combination, with such glass button, knob, or head, of a metallic ring having a flange inserted within the periphery and on the under side of the knob when in a plastic or molten condition, the ring thus secured serving to hold a plate to which the spike or nail is attached.

A in the drawing represents a button, knob, or nail-head made of glass, of suitable size and shape.

To its inner face is secured a metal ring, B, which has inwardly-projecting prongs, $a$ $a$, that are fitted into the glass while the same is still in a semi-liquid state, they serving therefore to firmly connect the ring with the glass. The ring, as applied to the glass, projects like a flange from the glass, as in figs. 1 and 4.

C is the metal plate, which is provided with a screw-thread, $b$, as in fig. 4, or with projecting ears, $c$, as in fig. 5, or with other suitable means for holding the nail D, or other article of which the glass is to be the head. This plate, which I prefer to provide with scalloped edges, as in fig. 2, to make it more elastic, is just large enough to fit within the ring B, as indicated in fig. 4. When the plate C is placed against the glass, but within the ring, the ring is turned inwardly to overlap said plate, and thereby secure the same to the glass, as is clearly shown in fig. 5.

Having thus described my invention,

I claim as new and desire to secure by Letters Patent—

The combination, with the knob A, of the ring B, inserted within the periphery and on the under side of the same when in a plastic or molten state, and having its edge turned down over the plate C, which is adapted to receive a shank or nail, substantially as specified.

THOMAS C. RICHARDS.

Witnesses:
GEO. W. MABEE,
T. B. MOSHER.